Figure 1:
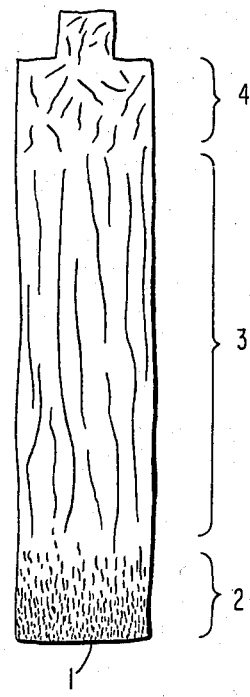

United States Patent [19]
Steingroever

[11] 3,985,596
[45] Oct. 12, 1976

[54] PROCESS FOR PRODUCING CRYSTAL-ORIENTED PERMANENT MAGNETS

[75] Inventor: Erich Steingroever, Bonn, Germany

[73] Assignee: Magnetfabrik Bonn GmbH vorm. Gewerkschaft Windhorst, Bonn am Rhine, Germany

[22] Filed: July 19, 1974

[21] Appl. No.: 489,892

[30] Foreign Application Priority Data
July 20, 1973  Germany............................ 2336901

[52] U.S. Cl..................................... 156/6; 156/18; 252/79.2
[51] Int. Cl.² ........................................ C23F 1/00
[58] Field of Search ............ 148/31.57, 101; 134/3, 134/41; 29/607–609, DIG. 95, 105; 335/296, 297, 302; 264/67; 156/6, 18, 153, 264; 252/79.2

[56] References Cited
UNITED STATES PATENTS
3,516,881   6/1970   Powell et al. .......................... 156/17
3,839,102   10/1974   Tawara et al. ............... 148/31.57 X OTHER PUBLICATIONS
Metallography, vol. 3, No. 4, Dec. 1970, Etching Technique for Revealing Substructure Cementite Cement with the Light Microscope by W. F. Kindle et al., pp. 421–432.

Primary Examiner—William A. Powell
Attorney, Agent, or Firm—George H. Mitchell, Jr.

[57]   ABSTRACT

A process for preparing anisotropic permanent magnets from crude solidified cast bars of magnet material consists in etching the surface thereof to determine the crystalline structure of the several zones of the bar before subdividing it.

11 Claims, 1 Drawing Figure

PROCESS FOR PRODUCING CRYSTAL-ORIENTED PERMANENT MAGNETS

The present invention relates to a process for producing crystal-oriented permanent magnets, that is, wherein the preferred magnetic directions of the crystals correspond with one another.

It is already known to produce permanent magnets of this type by a casting process, wherein the crystal-orientation is produced by unilateral heat abstraction during solidification.

FIG. 1 represents, by way of example, a cross-sectional view of a cylindrical bar produced in this way from an Alnico alloy.

The bar shown in FIG. 1 was cast in a ceramic mold heated to a high temperature. The mold was arranged on a cooled steel plate so that solidification commenced on the underside 1 and the crystals grew upwards in an axial direction, whereupon small directed crystals are formed in zone 2 and subsequently, large crystals in zone 3. Non-directional crystals 4 are formed above the zone 3.

The magnets produced from zone 3 comprising the large directed crystals have improved magnetic properties such as remanence, coercive field strength and $B.H_{max}$, than magnets produced from the other zones. A disadvantage is that zones 2, 3 and 4 are not visible on the outside and thus when the cast bars are separated into individual magnets, good magnets and magnets of poorer quality are mixed together. This is further aggravated in that the length of the good zone 3 varies with the individual bars.

The present invention consists in rendering the crystal orientation visible on the surface of the magnets before they are separated so that the good magnets from zone 3 and the poorer quality magnets can be sorted out before or during the separation of the bars into individual magnets. Efforts to magnetically determine the differences in the crystal orientation have hitherto failed.

According to the invention, the crystal orientation is made visible on the surface by etching the crude cast pieces. When a suitable etching reagent is used, the crystal orientation becomes clearly visible on the surface and, in this way, the cuts for separating the bars into individual magnets can be made accordingly.

The following etching reagent proved successful when the invention was employed with Alnico magnets:

|     | 1000 ml | water |
| --- | --- | --- |
|     | 1000 ml | sulfuric acid, diluted 1:2 |
|     | 250 ml | hydrochloric acid, density 1,19 |
|     | 60 ml | hydrogen peroxide 30% |
| ca. | 5 g | ferric chloride |
|     | 1 g | copper chloride $CuCl_2+2H_2O$. |

The cast magnetic pieces are cleaned, for example, sand blasted and dipped for approximately 10 minutes in the etching reagent. When they are rinsed with water and dried, the crystal orientation is clearly visible on the surface. This applies even if the bars are still wet or moist. It is then possible to mark the limits of the desired crystal orientation and divide the bars into individual magnets accordingly. The ends where the crystal orientation is of poorer quality can be removed.

The etching of metals to produce micrographs is certainly already known, but the use of etching to indicate crystal orientation before separating magnetic bars into individual magnets was hitherto unknown.

The present process can be applied to all metal magnets, for example, magnets made of aluminum, nickel, cobalt, iron alloys or samarium-cobalt alloys or alloys of rare earths and cobalt, possibly containing known additives.

The content of the individual components of the aforementioned etching solution may be varied within a range of approximately 50%. Also, other known solutions capable of etching steel alloys, especially stainless steel alloys, may be used in carrying out the process.

What is claimed is:

1. In a process for preparing anisotropic permanent magnets, comprising the steps of introducing molten permanent magnet material into a vertically elongated mold, unilaterally abstracting heat to solidify the material in said mold and to cause growth of crystals in an upward direction from the bottom of the mold, removing mold material from the magnet material after solidification of the magnet material into a bar, treating the surface of the solidified bar with an etching solution to expose the crystalline structure of the bar, and subdividing the etched bar.

2. A process as claimed in claim 1, which includes the step of sandblasting the solidified bar prior to said etching step.

3. A process as claimed in claim 2, which includes the step of cleaning said solidified bar prior to said sandblasting step.

4. A process as claimed in claim 1, wherein the etching solution is comprised of: (a) 7 to 20 percent by weight of sulfuric acid; (b) 2 to 8 percent by weight of hydrochloric aicd; (c) 0.3 to 1.5 percent by weight of hydrogen peroxide; (d) 0.05 to 1 percent by weight of ferric chloride; (e) 0.01 to 0.2 percent by weight of cupric chloride; and the remainder water.

5. A process as claimed in claim 1, wherein the etching solution is comprised of: (a) about 14.4 percent by weight of sulfuric acid; (b) about 4.1 percent by weight of hydrochloric acid; (c) about 0.78 percent by weight of hydrogen peroxide; (d) about 0.22 percent by weight of ferric chloride; (e) about 0.043 percent by weight of cupric chloride; and (f) the remainder water.

6. A process as claimed in claim 5, which includes the step of sandblasting said solidified bar prior to said etching step, and said etching step includes immersing said bar in said solution for a period of time between 7 and 14 minutes.

7. A process as claimed in claim 6, which includes the step of removing said etching solution by the application of water.

8. A process as claimed in claim 1, wherein the permanent magnetic material comprises an aluminum-nickel-cobalt-iron alloy, a samarium-cobalt alloy or an alloy of rare earths and cobalt.

9. A process as claimed in claim 1, which includes the step of subdividing said bar into elongated permanent magnets having axially directed crystal orientation after performing said etching step.

10. An etching reagent for etching anisotropic permanent magnets which comprises: (a) 7 to 20 percent by weight of sulfuric acid; (b) 2 to 8 percent by weight of hydrochloric acid; (c) 0.3 to 1.5 percent by weight of hydrogen peroxide; (d) 0.05 to 1 percent by weight of ferric chloride; (e) 0.01 to 0.2 percent by weight of cupric chloride; and the remainder water.

11. An etching reagent as claimed in claim 10, which contains: (a) about 14.4 percent by weight of sulfuric and; (b) about 4.1 percent by weight of hydrochloric acid; (c) about 0.78 percent by weight of hydrogen peroxide; (d) about 0.22 percent by weight of ferric chloride; (e) about 0.043 percent by weight of cupric chloride; and (f) the remainder water.

\* \* \* \* \*